United States Patent
Vandal et al.

(10) Patent No.: US 6,598,426 B2
(45) Date of Patent: Jul. 29, 2003

(54) METHOD OF MAKING A VEHICLE WINDOW WITH OPAQUE LAYER

(75) Inventors: Robert Vandal, Syracuse, IN (US); John Bradford, Livonia, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 118 days.

(21) Appl. No.: 09/832,334

(22) Filed: Apr. 11, 2001

(65) Prior Publication Data

US 2002/0148255 A1 Oct. 17, 2002

(51) Int. Cl.7 .............................................. C03B 21/02
(52) U.S. Cl. .............................. 65/105; 65/33.2; 65/54; 65/55; 65/63; 65/102; 156/99; 156/101; 156/106; 156/256; 156/264
(58) Field of Search .................. 65/33.2, 54, 55, 65/63, 102, 105; 156/99, 101, 106, 256, 264; 428/426, 437, 441, 38

(56) References Cited

U.S. PATENT DOCUMENTS

| | | | |
|---|---|---|---|
| 4,596,590 A | | 6/1986 | Boaz |
| 4,654,067 A | * | 3/1987 | Ramus et al. |
| 4,718,932 A | * | 1/1988 | Pharms ............... 65/55 |
| 4,954,153 A | | 9/1990 | Coleman et al. |
| 4,959,090 A | | 9/1990 | Reinherz |
| 5,443,669 A | | 8/1995 | Tunker |
| 5,518,535 A | | 5/1996 | Boaz |
| 5,702,520 A | | 12/1997 | Boaz |
| 5,938,834 A | | 8/1999 | Boaz |
| 6,126,737 A | | 10/2000 | Mason |
| 6,176,919 B1 | | 1/2001 | Mason |
| 6,444,293 B1 | | 9/2002 | Gregory et al. |

* cited by examiner

Primary Examiner—Michael Colaianni
(74) Attorney, Agent, or Firm—Nixon & Vanderhye P.C.

(57) ABSTRACT

A method of making a vehicle windshield or other window. An opaque layer (e.g., enamel or water-based) is applied to a glass sheet and then "fired" or cured. The opaque layer is preferably black or dark in color. Thereafter, the sheet with the opaque layer thereon is cut into a desired windshield shape, along a cutting line which extends through both the glass sheet and the opaque layer formed thereon. As a result, on the cut glass sheet the opaque layer extends all the way up to the peripheral edge thereof. In vehicle windshield embodiments, the cut sheet is laminated to another glass sheet via at least a polymer based interlayer in order to form the vehicle windshield.

17 Claims, 7 Drawing Sheets

Fig. 1

(PRIOR ART)

METHOD OF MAKING A VEHICLE WINDOW WITH OPAQUE LAYER

This invention relates to a method of making a vehicle windshield. More particularly, this invention relates to a method of making a vehicle windshield in which an opaque layer on a substrate (e.g., glass sheet) of the windshield extends up to a peripheral edge thereof.

BACKGROUND OF THE INVENTION

Opaque layers are known for use on automotive and/or architectural glass. Such opaque layers are used, for example, to form opaque borders around the peripheral marginal surfaces of glazings used as windshields, side lites and/or backlites of motor vehicles. These borders are used to obstruct from view attachment devices for the glazings, and/or to protect adhesives or other materials from exposure to light which could possibly degrade them.

Known opaque layers include both ceramic enamels and water-based paints. Either one, as well as any other suitable opaque layer, may be used in conjunction with the instant invention. For purposes of example only, and without limitation, any of the opaque layers discussed or utilized in any of U.S. Pat. Nos. 4,954,153, 4,959,090, 5,443,669, 5,518,535, 5,698,026, or 6,126,737, may be utilized in conjunction with the instant invention. Each of these patents are hereby incorporated herein by reference.

With regard to opaque layers of ceramic enamel(s), for example, such layers are often dark or black in color due to the presence of colorant oxides such as chrome oxide, cobalt oxide, and/or nickel oxide. Typically, the opaque enamel is applied to a glass substrate in a predetermined pattern in any convenient manner including but not limited to silk screening or screen printing. Thereafter, the enamel is "fired" onto the glass, i.e., heated in order to melt (or at least partially melt) the enamel frit and fuse it to the glass surface. The firing temperature and length of time at such temperature required for firing (or curing) the opaque enamel depends on, among other things, the type and amount of frit as well as the thickness of the enamel. Thicker enamel layers with more glass frit therein, for example, require higher temperatures and/or longer exposures at the firing temperature in order to bond the enamel to the glass substrate. For example, firing of opaque enamel layers may require temperatures in excess of 540 degrees C, even over 590 degrees C in certain instances.

Water-based opaque layers are similar in color to the opaque enamel layers discussed above. However, when water-based opaque layers are used, they are painted onto or otherwise applied to the substrate (e.g., glass substrate) and in some instances may be cured by baking at a lesser temperature (e.g., from about 200–440 degrees C.).

Figure 1:
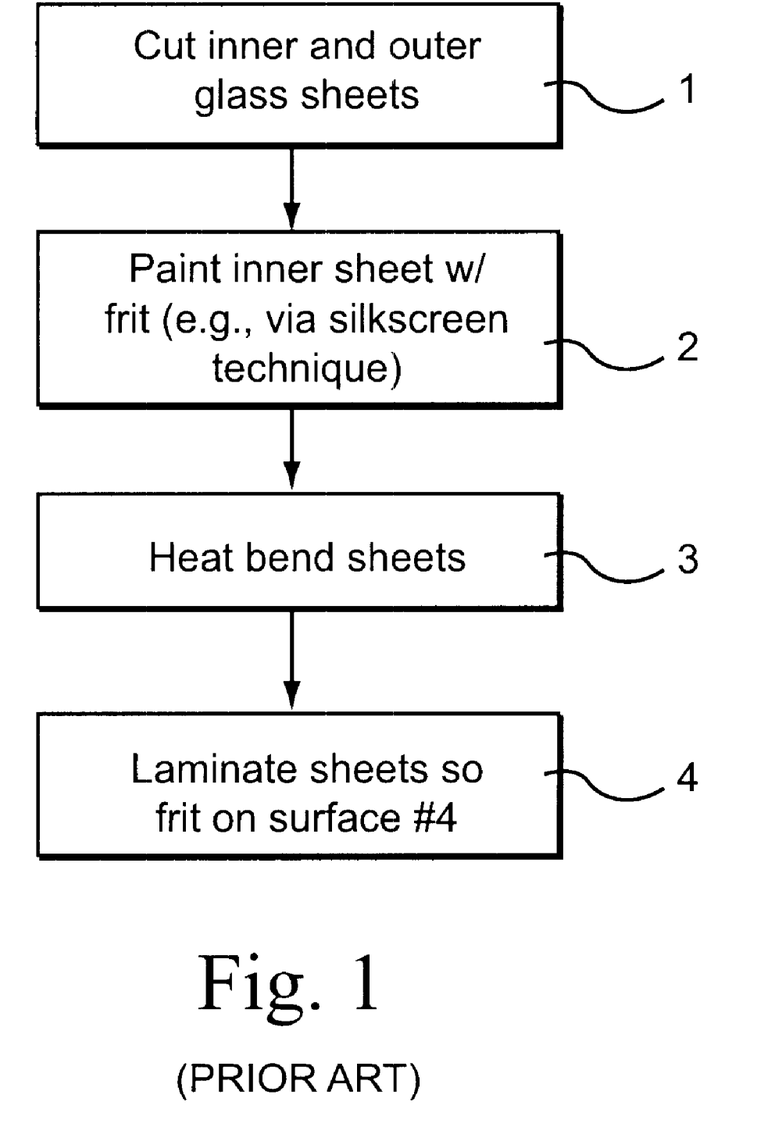
FIG. 1 is a flowchart illustrating steps taken in a conventional method of making a vehicle windshield.
Figure 2A:
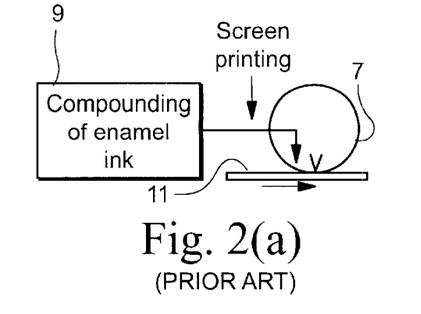
FIG. 2a is a schematic view illustrating a conventional technique of silk screening (i.e., painting) an opaque layer onto a glass substrate.
Figure 2B:
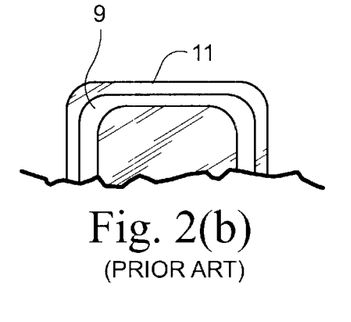
FIG. 2b is a partial plan view illustrating that the opaque layer formed in FIG. 2a does not extend all the way up to the edge of the glass sheet.

FIG. 1 is a flow chart illustrating a conventional method for making a vehicle windshield. As will be appreciated by those skilled in the art, a vehicle windshield typically includes first and second glass substrates (same as sheets herein) laminated to one another via a polymer based interlayer. The substrates/sheets may be flat or bent in different embodiments of this invention. As shown in FIG. 1, the inner and outer glass sheets are first cut into the desired windshield shape (step 1). Thereafter, what is to be the inner glass sheet is painted (e.g., via a silk screening technique) with an opaque enamel layer (step 2). The enamel is then "fired" into/onto the inner glass sheet, and the two glass sheets are thereafter heat bent in a conventional manner (step 3). After heat bending, the two sheets are laminated together via a polymer based interlayer, with the opaque layer being provided around the peripheral border of surface #4 (i. e., the surface of the inner sheet facing the vehicle interior) of the resulting windshield (step 4).

More particularly, reference is made to FIGS. 2–7 with regard to the aforesaid conventional technique of making vehicle windshields. As shown in FIG. 2a, the opaque layer material 9 is screen printed onto a border area of what is to be the inner glass substrate/sheet 11, after the sheet has been cut into its windshield shape. When silk screening is used to apply the opaque layer to the substrate, a silk screening drum 7 may be utilized in forming the enamel based opaque layer on the substrate 11. After the enamel has been heated and "fired", the resulting inner sheet is shown in FIG. 2b. In particular, as can be seen in FIG. 2b, the fired opaque enamel layer 9 is located around a peripheral area of the glass sheet 11, but is spaced inwardly from the peripheral edge thereof. If attempts were made to silk screen apply the opaque enamel layer up to the edge of the substrate, this would likely cause opaque enamel material to drip or run down the peripheral edge(s) of the substrate which would be undesirable. Accordingly, using conventional techniques, opaque layers 9 do not typically extend all the way up to the edge of a cut glass sheet upon which they are formed.

Figure 3:
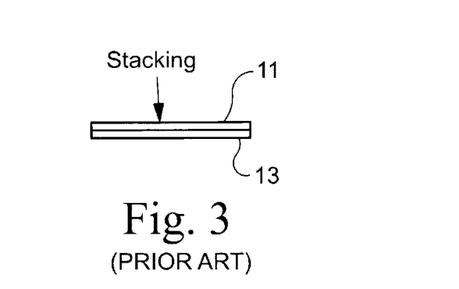
FIG. 3 is a side cross-sectional view illustrating the glass sheet of FIG. 2b being stacked with another glass sheet.
Figure 4:
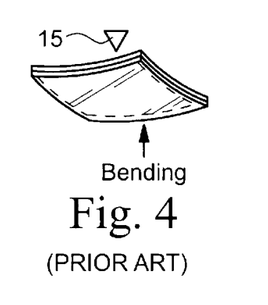
FIG. 4 is a perspective view illustrating the stacked glass sheets of FIG. 3 being heat bent (e.g., in an autoclave).
Figure 5:
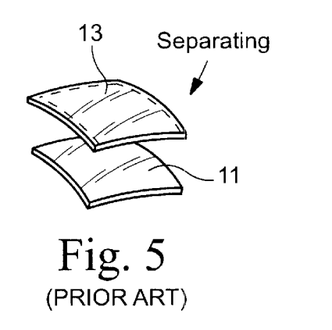
FIG. 5 is a perspective view illustrating the bent glass sheets of FIG. 4 being separated from one another following bending.
Figure 6:
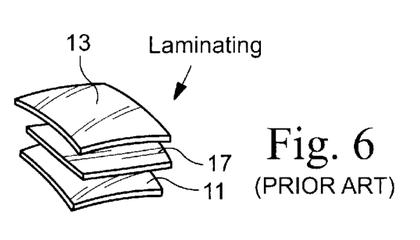
FIG. 6 is a perspective view illustrating a polymer based interlayer being inserted between the two bent glass sheets of FIG. 5.

After (or before in certain instances) the opaque layer 9 has been fired onto the inner glass substrate/sheet 11, the inner glass substrate 11 is stacked onto or together with what is to be the outer glass substrate/sheet 13 of the windshield as shown in FIG. 3. Thereafter, the two flat substrates 11, 13 are heat bent utilizing a heat source 15, as shown in FIG. 4. A heat source 15 may be provided on one or both sides of the sheets in FIG. 4, although only one source is illustrated for purposes of simplicity. After heat bending, the two bent glass sheets/substrates 11, 13 are separated as shown in FIG. 5, and a polymer based interlayer 17 is placed therebetween as shown in FIG. 6. The bent glass sheets 11, 13 are then laminated to one another with polymer based interlayer 17 therebetween so as to form the resulting laminated windshield of FIG. 7.

Figure 7:
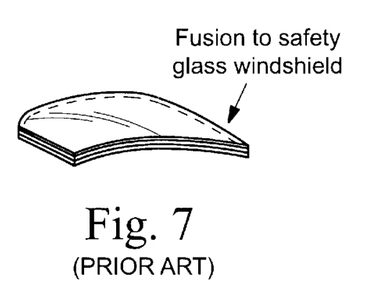
FIG. 7 is a perspective view illustrating a resulting curved laminated windshield made using the process of FIGS. 1–6.
Figure 8:
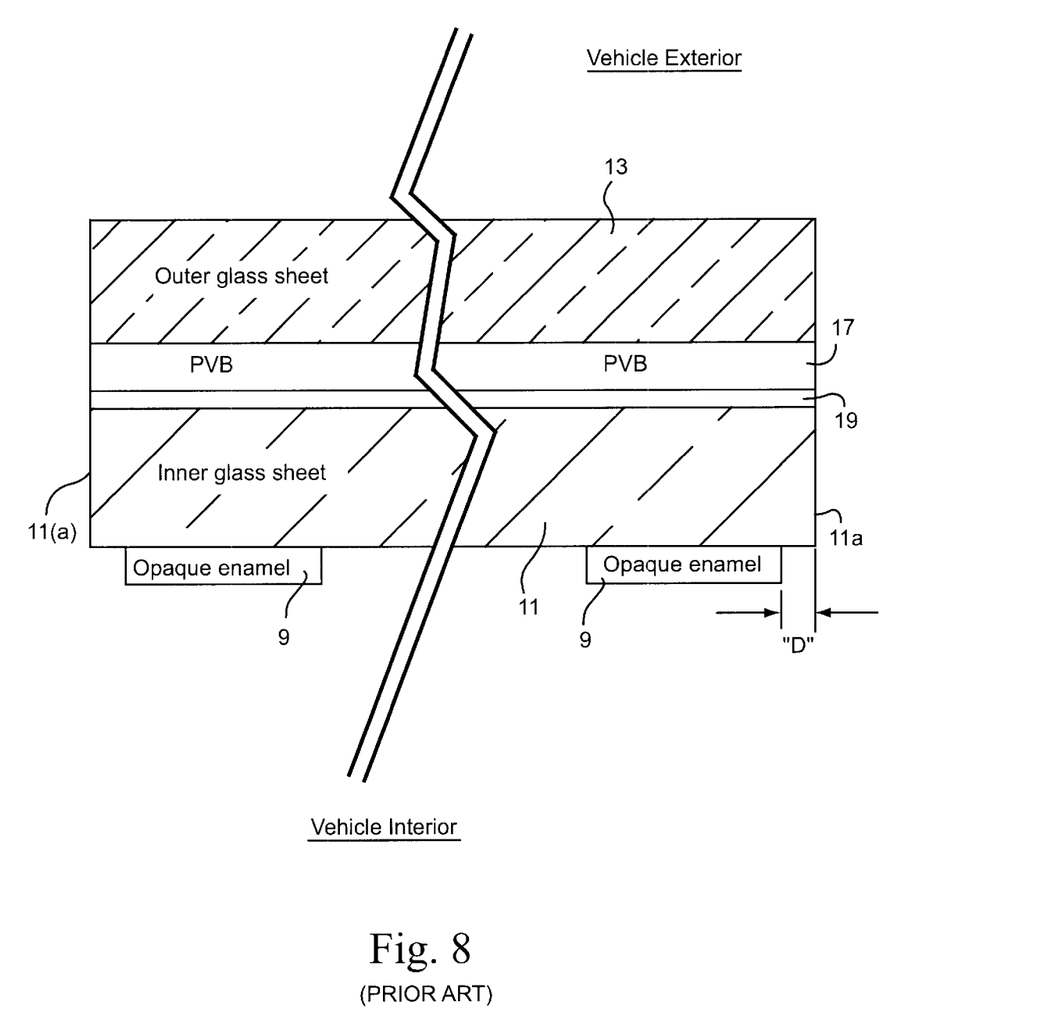
FIG. 8 is a side cross-sectional view of the windshield of FIG. 7, illustrating that the opaque enamel layer does not extend all the way up to the edge of the windshield.

FIG. 8 is a side cross-sectional view of the windshield of FIG. 7. In particular, the windshield includes inner glass sheet 11, outer glass sheet 13, polymer based interlayer (e.g., of polyvinyl butyral (PVB)), optional low-e coating 19, and opaque enamel layer 9 provided around the periphery of the #4 surface of the windshield. As previously mentioned, opaque enamel layer 9 does not extend all the way to the edge 11a of inner glass sheet 11. In particular, the opaque layer 9 is spaced inwardly from edge 11a by a distance "D" as shown in FIG. 8.

A growing trend in vehicles (e.g., cars, pick-up trucks, sport utility vehicles, minivans, etc.) is to utilize exposed edge windshields. However, with exposed edge windshields (or other vehicle windows), the spacing of opaque layer 9 inwardly a distance "D" from the peripheral edge 11a of the windshield is undesirable for aesthetic reasons. Instead, it is believed that it would be more aesthetically pleasing if the opaque layer could be formed so as to extend all the way up to the edge 11a of the windshield. Unfortunately, as explained above, this is not practical using conventional techniques, because for example if one attempts to silk screen opaque layer 9 onto an already cut glass sheet 11 all the way up to the edge 11a thereof, the opaque material will tend to drip or run down the edge 11a 'thereby becoming aesthetically unattractive or requiring extensive clean-up procedures.

In view of the above, it will be appreciated by those skilled in the art that there exists a need for a method of manufacturing a vehicle windshield (or other window) whereby an opaque layer (e.g., enamel or water based) can be formed so as to extend all the way up to the peripheral edge of the glass sheet upon which it is located in the final product. There also exists a need in the art for the resulting windshield product.

SUMMARY OF THE INVENTION

An object of this invention is to provide a method of making a vehicle windshield or other window.

Another object of this invention is to provide a method of making a vehicle windshield whereby an opaque layer (e.g., enamel or water based) may be formed so as to extend all the way up to the peripheral edge of the resulting windshield. Such a feature is believed to be aesthetically pleasing, especially in exposed edge windshield applications.

Another object of this invention is to provide a method of making a vehicle windshield, wherein the opaque layer is applied to a glass substrate before the glass substrate is cut into its desired windshield shape. After application of the opaque layer and firing/curing of the same, the glass sheet is cut into the desired windshield shape along a cutting line which is aligned so that the cut is made through both the glass sheet and the opaque layer thereon so that the resulting sheet has the opaque layer extending all the way up to at least a portion of the edge thereof. Thereafter, the coated sheet may be laminated to another glass sheet in order to form the resulting windshield.

Another object of this invention is to "fire" or cure an applied opaque layer (enamel or water based) on a glass sheet using microwave energy.

Another object of this invention is to fulfill one or more of the above-listed objects.

Generally speaking, certain example embodiments of this invention fulfill one or more of the above-listed objects by providing a method of making a vehicle windshield, the method comprising:

providing a first glass sheet;

applying an opaque layer on the first glass sheet;

firing or curing the opaque layer on the first glass sheet using microwave energy;

after the firing or curing of the opaque layer on the first glass sheet, cutting the first glass sheet along a cutting line into a desired peripheral shape, wherein the cutting along the cutting line extends through both the first glass sheet and the fired or cured opaque layer thereon so that after said cutting the opaque layer extends all the way to a peripheral edge of the cut glass sheet; and laminating the cut first glass sheet to a second glass sheet in order to form the vehicle windshield.

Certain other embodiments of this invention fulfill one or more of the above listed objects by providing a method of making a window, the method comprising:

providing a first glass sheet;

applying a dark colored or black opaque layer on the first glass sheet;

firing or curing the dark colored or black opaque layer on the first glass sheet;

after the firing or curing of the dark colored or black opaque layer on the first glass sheet, cutting the first glass sheet along a cutting line into a desired peripheral shape, wherein the cutting along the cutting line extends through both the first glass sheet and the fired or cured opaque layer thereon so that after said cutting the opaque layer extends all the way to a peripheral edge of the cut first glass sheet.

DETAILED DESCRIPTION OF CERTAIN EMBODIMENTS OF THIS INVENTION

Referring now more particularly to the accompanying drawings in which like reference numerals indicate like parts throughout the several views.

Figure 9A:
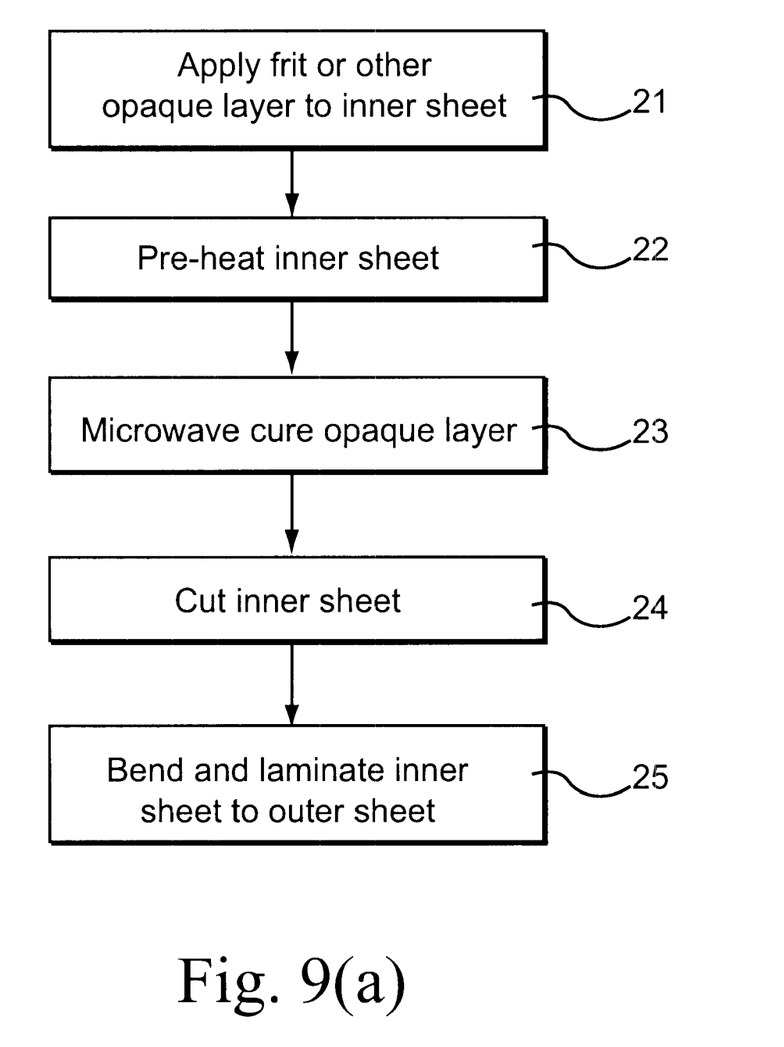
FIG. 9a is a flowchart illustrating a method of making a vehicle windshield according to an example embodiment of this invention.
Figure 9B:
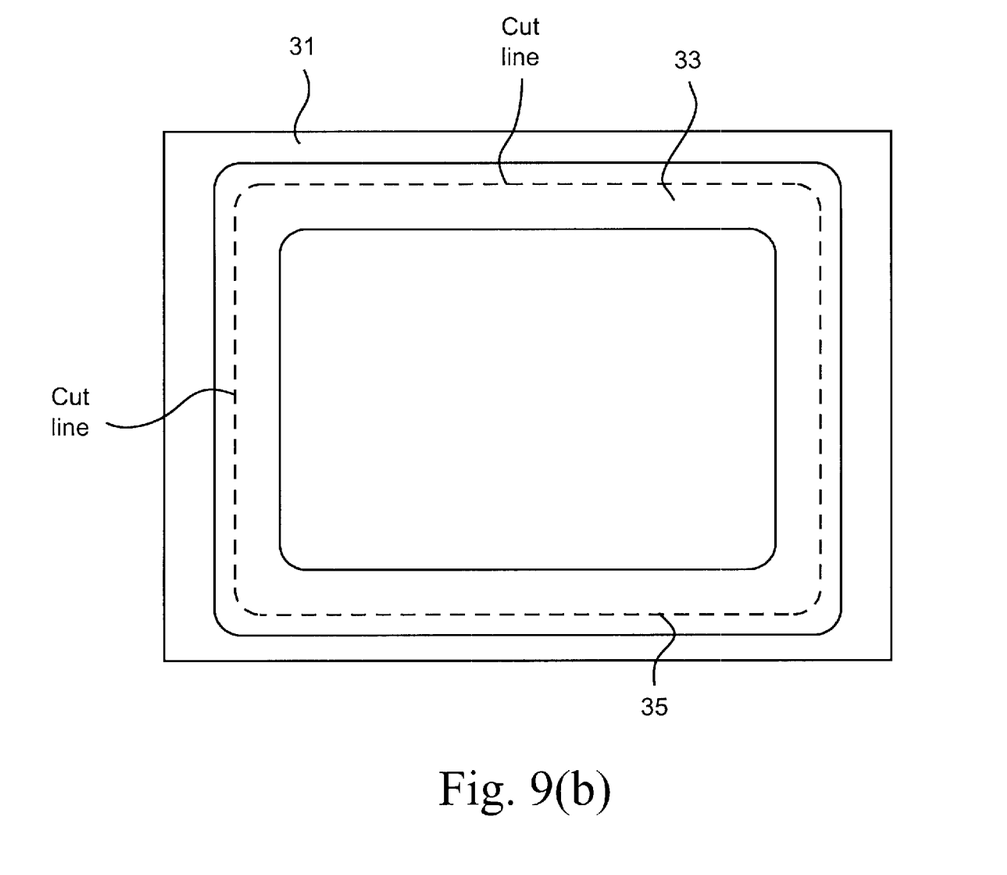
FIG. 9b is a top plan view of a glass sheet after it has been coated with an opaque layer (but before cutting into its final windshield/window peripheral form), with the intended windshield/window peripheral cut line illustrated in a dotted line.

Generally speaking, FIGS. 9a–9b illustrate how a vehicle windshield is made according to an example embodiment of this invention. What is to be a sheet (e.g., preferably the inner sheet, but possibly the outer sheet in alternative embodiments of this invention) 31 of the windshield is provided. Sheet 31 may be approximately flat at this point in the process, and made of glass (e.g., soda-lime-silica glass). A black or dark colored opaque layer 33 (e.g., opaque frit inclusive enamel, or water-based opaque layer) is applied onto a surface (directly or indirectly in different embodiments of this invention) of sheet 31 as shown in FIG. 9b (see step 21 in FIG. 9a). Sheet 31 has not yet been cut to its desired windshield peripheral size, and the opaque layer 33 is deposited or applied on sheet 31 over what is ultimately to be the windshield peripheral cut line 35. After application of opaque layer 33, sheet 31 together with the opaque layer 33 thereon is preheated (step 22). After preheating, the opaque layer 33 is exposed to microwave energy in order to "fire" or cure the opaque layer 33 into/onto the glass sheet 31 (step 23). After firing/curing, the glass sheet 31 is cut into its desired windshield shape along cutting line 35 (step 24). After cutting, the sheet 31 is heat bent and laminated to another glass sheet in order to form the resulting laminated vehicle windshield (step 25).

As can be seen from FIG. 9b, because glass sheet 31 is only cut to its desired windshield peripheral shape after deposition and firing/curing of the opaque layer, it can be cut along line 35 through the opaque layer 33, which enables the opaque layer 33 to extend all the way up to the resulting peripheral edge 35a of the resulting windshield.

Figure 10:
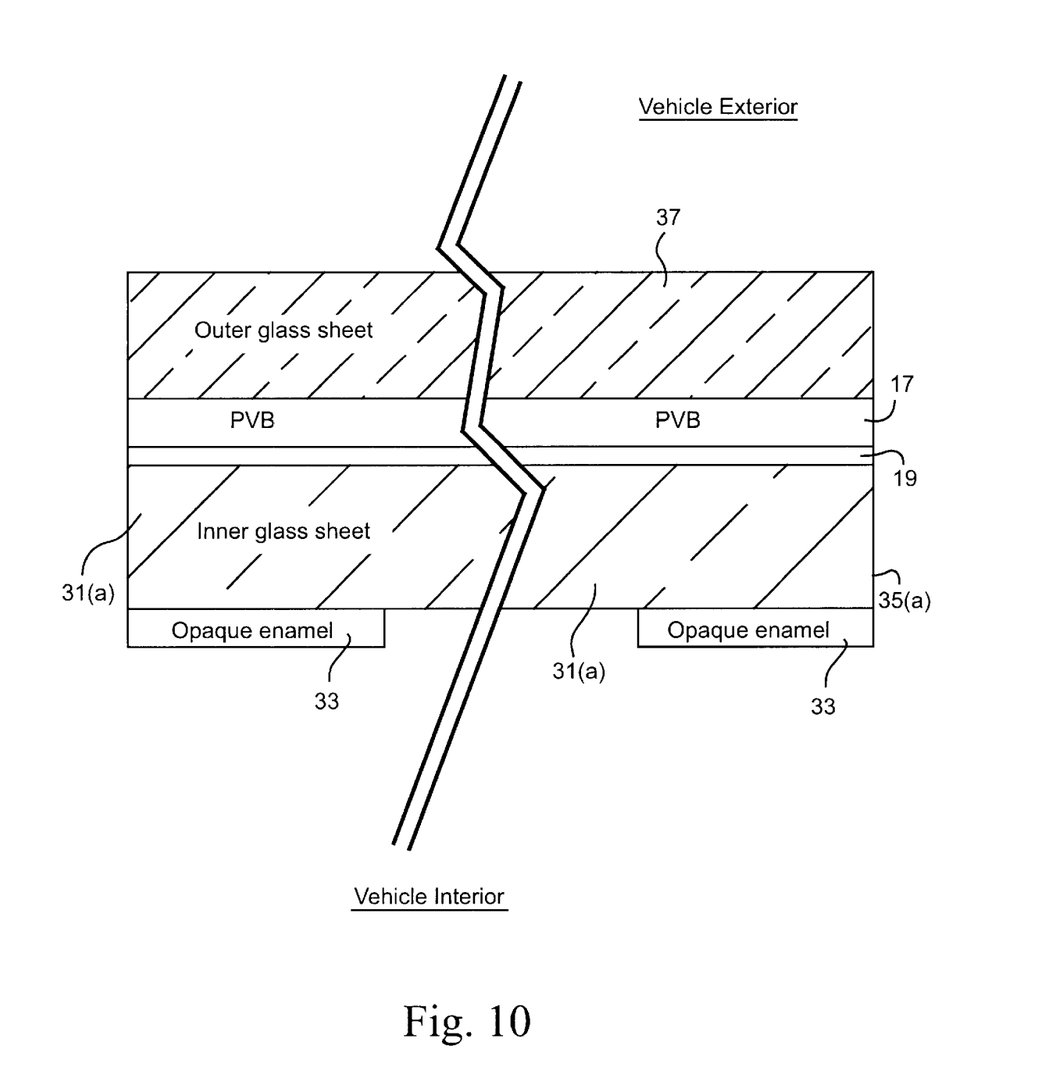
FIG. 10 is a side cross-sectional view of a vehicle windshield according to an embodiment of this invention.

FIG. 10 is a cross-sectional view of an example windshield resulting from the process of FIGS. 9a–9b. The windshield (flat or curved in different embodiments of this invention) includes inner glass sheet (flat or curved) 31a having peripheral edge 35a, outer glass sheet (flat or curved) 37, PVB inclusive interlayer 17 located between sheets 35a and 37, and optional low-E coating 19 provided on one or both sheets. In FIG. 10, reference numeral 31a refers to the inner glass sheet after it has been cut along cutting line 35. Also, reference numeral 35a refers to the peripheral edge of inner glass sheet/substrate 31a as a result of having been cut along line 35 into the desired windshield peripheral shape.

Still referring to FIG. 10, it can be seen that opaque enamel layer 33 extends all the way up to at least a portion of the peripheral edge 35a of inner glass sheet 31a and thus of the windshield. In certain embodiments of this invention, layer 33 extends all the way up to the peripheral edge of the sheet 31a around all sides thereof; while in other embodiments of this invention opaque layer 33 may extend all the way up to the peripheral edge of the sheet 31a along one, two, or three sides thereof. The windshield of FIG. 10 is significantly more aesthetically pleasing than the windshield of prior art FIG. 8, because in FIG. 10 the opaque layer 33 extends all the way up to the edge 35a of the windshield.

As discussed above, opaque layer 33 may be dark or black glass frit inclusive enamel, dark or black organic primer, dark or black water-based frit inclusive, or any other suitable opaque material. For example and without limitation, any of the opaque layers discussed or utilized in any of U.S. Pat. Nos. 4,954,153, 4,959,090, 5,443,669, 5,518,535, 5,698,026, or 6,126,737, may be utilized in conjunction with the instant invention.

Figure 11:
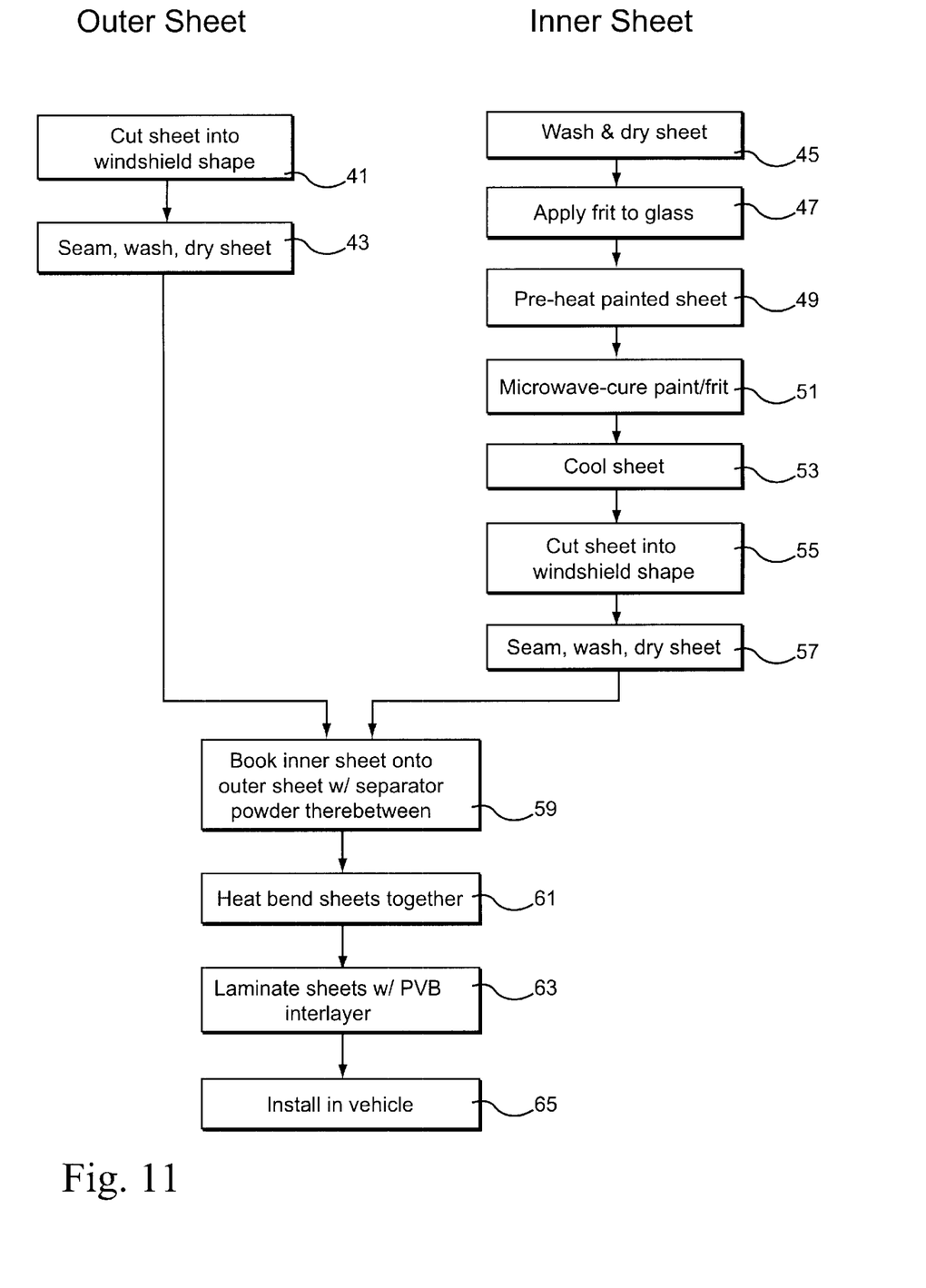
FIG. 11 is a more detailed flowchart illustrating a method of making a vehicle windshield according to an embodiment of this invention.

FIG. 11 is a more detailed flowchart illustrating how the windshield of FIG. 10 is made according to an example embodiment of this invention. The inner and outer glass sheets may be processed simultaneously on parallel processing lines in a manufacturing plant in one example embodiment of the invention. The outer glass sheet is cut into its windshield peripheral shape (step 41), and the resulting outer glass sheet 37 is seamed, washed, and dried (step 43).

As for the inner glass sheet 31 (not yet cut into its desired windshield peripheral shape), it is washed and dried (step 45). Opaque layer 33 is then applied onto a surface (directly, or indirectly over a primer or the like) of glass sheet 31 (e.g., via silk screening, printing, painting, or any other suitable method) (step 47). Glass sheet 31 with the uncured opaque material 33 thereon is then preheated (step 49). During this preheating, sheet 31 may be heated to a temperature of from about 200–540 degrees C (more preferably from 200–380 degrees C), in order to reduce the likelihood of thermal shock to the glass during a subsequent microwave firing/curing step.

After preheating, microwave energy is directed at opaque material 33 (e.g., in the form or a focused or non-focused beam) in order to heat the same and "fire" (or cure) the opaque material to the glass sheet 31 (step 51). In preferred embodiments of this invention, the microwave energy utilized to heat opaque material 33 in step 51 has a wavelength of from about 1–10 mm, more preferably from about 2–8 mm, and most preferably from about 5–8 mm (this is in contrast to standard home use microwaves having a wavelength of from 15–25 mm). Surprisingly, it has been found that these microwave wavelengths enable the opaque material 33 to be heated in a much more efficient manner, and microwaves enable selective heating of the frit. In certain embodiments of this invention, in step 51, when enamel frit inclusive opaque material is utilized for layer 33, the opaque material is heated to a temperature of from about 500–650 degrees C, more preferably from a temperature of from about 560–580 degrees C during this firing. Lesser temperatures may be used for water-based opaque layers.

While microwave energy is preferred in step 51, other means of heating the opaque material 33 may also be utilized. For example, IR energy may be utilized, or a conventional oven may be utilized. However, these alternative techniques add much cost and/or overhead to the production line required to make the windshield according to this invention. Thus, the use of microwave curing of the opaque material 33 is preferred in certain embodiments.

After firing/curing of the opaque material 33, sheet 31 with the fired/cured opaque material 33 thereon is cooled (step 53). In certain embodiments of this invention, the sheet with opaque material thereon is cooled at a rate no quicker than about 75 degrees C per minute until the entire assembly (i.e., frit and adjacent glass) is below about 480 degrees C. This cooling may be achieved, for example and without limitation, by having the glass pass through a heated tunnel which may be at about 550 degrees C at its entrance and 100 degrees C at its exit. The glass could be placed in the tunnel right after the microwave frit firing process, but before cutting. Additional cooling may also be used, as it is desirable that the glass be near room temperature during the cutting process.

Then, sheet 31 with the opaque layer 33 thereon is cut along cutting line 35 into the desired windshield peripheral shape (step 55). The cut sheet 31a is then seamed/edge-finished/ground, washed, and dried (step 57). Inner sheet 31a and outer sheet 37 are then booked together with separating powder therebetween (step 59). The two sheets after booking together (e.g., see FIG. 3) are then heat bent together in a known manner (step 61). The two sheets 31a and 37 are then separated, and a polymer interlayer 17 (e.g., PVB) is placed therebetween. Sheets 31a and 37 are then heated in order to laminate the two sheets together, with PVB inclusive interlayer 17 therebetween (step 63). Optionally, a low-e coating 19 may be provided on the interior surface of one or both glass sheets. Finally, the resulting windshield is shown in FIG. 10, and is ready to be installed in a vehicle (step 65). In certain preferred embodiments, as shown in FIG. 10, the opaque layer 33 may be on the #4 surface of the windshield, i.e., on the side of the windshield facing and exposed to the interior surface of the vehicle. In alternative embodiments of this invention, the opaque layer(s) may be on the #1 surface of the windshield (i.e., exposed to the ambient atmosphere outside the vehicle), and may even be on the #2 or #3 surface in certain less preferred embodiments of this invention.

Once given the above disclosure, many other features, modifications, and improvements will become apparent to the skilled artisan. For example, the instant invention is not limited to vehicle windshield applications, and for example may also be used in conjunction with vehicle backlites and/or sidelites. Such other features, modifications, and improvements are therefore considered to be a part of this invention, the scope of which is to be determined by the following claims.

What is claimed is:

1. A method of making a vehicle windshield, the method comprising:

providing a first glass sheet;

applying an opaque layer on the first glass sheet;

firing or curing the opaque layer on the first glass sheet using microwave energy;

after the firing or curing of the opaque layer on the first glass sheet, cutting the first glass sheet along a cutting line into a desired peripheral shape, wherein the cutting along the cutting line extends through both the first glass sheet and the fired or cured opaque layer thereon so that after said cutting the opaque layer extends all the way to a peripheral edge of the cut first glass sheet; and laminating the cut first glass sheet to a second glass sheet in order to form the vehicle windshield.

2. The method of claim 1, wherein the microwave energy used in said firing or curing has a wavelength of from 1–10 mm.

3. The method of claim 2, wherein the microwave energy used in said firing or curing has a wavelength of from 5–8 mm.

4. The method of claim 1, wherein the opaque layer comprises a black enamel.

5. The method of claim 1, further comprising preheating the first glass sheet with the opaque layer thereon, prior to said firing or curing.

6. The method of claim 5, wherein said preheating comprises preheating at least a portion of the first glass sheet to a temperature of from 200–540 degrees C.

7. The method of claim 1, wherein said laminating further comprises laminating the cut first glass sheet to a second glass sheet with at least a polymer inclusive interlayer provided therebetween.

8. The method of claim 1, further comprising heat bending the first and second glass sheets together after said cutting but before said laminating, so that the glass sheets in the resulting windshield are each bent.

9. The method of claim 1, wherein said firing or curing the opaque layer using microwave energy comprises heating the opaque layer using microwave energy to a temperature of at least 500 degrees C.

10. The method of claim 9, wherein said firing or curing the opaque layer using microwave energy comprises heating the opaque layer using microwave energy to a temperature of from 500 to 650 degrees C.

11. A method of making a window, the method comprising:

providing a first glass sheet;

applying a dark colored or black opaque layer on the first glass sheet;

firing or curing the dark colored or black opaque layer on the first glass sheet; and after the firing or curing of the dark colored or black opaque layer on the first glass sheet, cutting the first glass sheet along a cutting line into a desired peripheral shape, wherein the cutting along the cutting line extends through both the first glass sheet and the fired or cured opaque layer thereon so that after said cutting the opaque layer extends all the way to a peripheral edge of the cut first glass sheet.

12. The method of claim 11, further comprising laminating the cut first glass sheet to a second glass sheet in order to form a vehicle windshield.

13. The method of claim 11, wherein said firing or curing the opaque layer on the first glass sheet comprises heating the opaque layer using microwave energy.

14. The method of claim 13, wherein said microwave energy has a wavelength of from 1–10 mm.

15. The method of claim 11, further comprising heat bending the first glass sheet and a second glass sheet together after said cutting, and thereafter laminating the first and second sheets to one another with at least a polymer inclusive interlayer therebetween to help form a windshield so that the glass sheets in the resulting windshield are each bent.

16. The method of claim 11, wherein the opaque layer extends all the way to a peripheral edge of the cut glass sheet around the entire periphery of the cut glass sheet.

17. The method of claim 1, wherein the opaque layer extends all the way to a peripheral edge of the cut glass sheet around the entire periphery of the cut glass sheet.

* * * * *